E. BROWNFIELD.
FIFTH WHEEL.
APPLICATION FILED MAR. 4, 1911.
1,055,871. Patented Mar. 11, 1913.
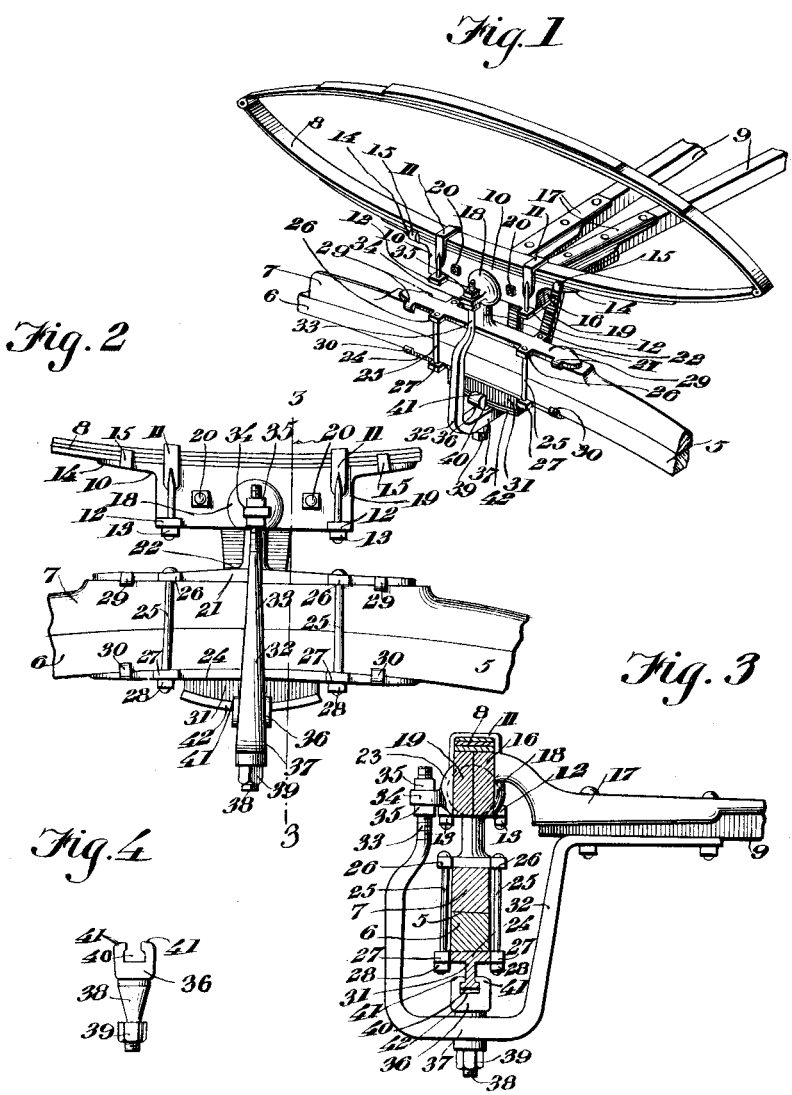
Witnesses
A. W. Gardes
V. B. Hillyard
Inventor
Ewing Brownfield
By Victor J. Evans
Attorney

UNITED STATES PATENT OFFICE.

EWING BROWNFIELD, OF OKLAHOMA, OKLAHOMA, ASSIGNOR OF ONE-HALF TO THEODORE L. KLAFFKE, OF OKLAHOMA, OKLAHOMA.

FIFTH-WHEEL.

1,055,871. Specification of Letters Patent. Patented Mar. 11, 1913.

Application filed March 4, 1911. Serial No. 612,299.

*To all whom it may concern:*

Be it known that I, EWING BROWNFIELD, a citizen of the United States, residing at Oklahoma city, in the county of Oklahoma and State of Oklahoma, have invented new and useful Improvements in Fifth-Wheels, of which the following is a specification.

The object of this invention is to produce a fifth wheel for wagons, buggies, and other vehicles. First, which will have less tendency to twist the vehicle bed or coupling pole. Second, which will be more durable. Third, which will allow the front axle to swing more easily in turning the vehicle.
Fourth, which will prevent the front axle from rocking or revolving forward or backward. Fifth, which may be attached to any vehicle without drilling or cutting the axle, springs, or other associate parts. In carrying out these objects the inventor has designed and constructed the mechanism shown by the annexed drawings, in which;

Figure 1 is a perspective view of the fifth wheel, taken from the front of the vehicle, showing also the front axle, the front spring, and the coupling pole. Fig. 2 is a fragmental front elevation of the parts shown in Fig. 1. Fig. 3 is a sectional view taken on the line 3—3 of Fig. 2. Fig. 4 is an elevation view of a pivoted guiding block, looking in the same direction as in Fig. 3.

Referring to the several figures, in all of which like characters of reference designate like parts, the numeral 5 designates the front axle of a vehicle which, in this instance, is composed of the usual iron axle proper 6, with the common wooden axle bed 7 resting thereon.

The usual front spring 8 of the vehicle is also shown, together with the coupling pole 9 which, in this instance, is double.

In the arrangement of the improvements, a two-part metal block 10 is provided, and forms a support upon which the spring 8 rests, the spring being clamped securely to said block by clips 11 which straddle said spring and have their lower ends passed through lugs 12 on the lower edges of said block.

The lower ends of the clips 11 are provided with screw nuts 13 which are screwed up tightly against the lugs 12 to clamp the spring 8 to the supporting block 10.

The ends 14 of the supporting block 10 extend outward as an additional support for the spring 8, said ends being provided with small lugs 15 which project upward onto the front and rear faces of said spring to retain the latter in place. This supporting block 10 is separable on a vertical plane extending laterally of the vehicle, the rear half 16 of the block having two integral rearwardly extending stubs 17 which are bolted securely to and house the front ends of the members of the double coupling pole 9.

A ball-socket 18 is formed between the rear half 16 and the front half 19 of the supporting block 10 to pivotally receive the ball portion of a member later described, the front and rear halves being secured together by bolts 20.

In the further arrangement of the improvements, a plate 21 rests upon the wooden bed portion 7 of the axle 5, this plate having an upwardly projecting neck 22 with a ball 23 on its upper end. This plate 21 is pivotally attached to the supporting block 10 of the spring 8 by placing the ball 23 into the ball-socket 18 of said block, the ball-socket being of more than hemispherical depth so as to retain the ball therein.

A small plate 24 rests against the lower face of the axle 5, and this plate 24 and the plate 21 above the axle are clamped to said axle by bolts 25 which extend down through lugs 26 on the upper plate and through lugs 27 on the lower plate, said bolts being provided with nuts 28 which are screwed up tightly to clamp the plates and the axle together.

The plates 21 and 24 are provided respectively with small lugs 29 and 30 which engage the front and rear faces of the axle 5 as an additional security of attachment.

The lower plate 24 of the axle 5 is provided centrally with a depending integral web 31 which extends lengthwise of said axle, the lower edge of the web being curved on a line concentric to the ball and socket pivot above described.

A bracketed brace 32 having its rear end bolted to the front end of the coupling pole 9 extends downward and forward under the axle 5 and attached parts, and upward in front of said axle, the upwardly projecting front end 33 of said brace being screw-threaded and extended upward through a lug 34 which projects forward integrally from the front half 19 of the supporting block 10. This front end 33 is provided with screw nuts 35 above and below the lug 34 so that it may be fastened rigidly to said lug.

A guiding head 36, shown separately by Fig. 4, is mounted pivotally on the lower horizontal portion 37 of the brace 32 on a vertical axis of revolution, said head having a stem 38 which passes revolubly down through said brace and is held therein by a nut 39 on the lower end of said stem.

The guiding head 36 is provided on its upper surface with a slot 40, which slidably engages the lower curved edge of the web 31, said head being provided on each side of its slot with hooks or lips 41 which hook over forwardly and rearwardly extending flanges 42 on the lower curved edge of said web as a security against disengagement of said web and head.

In swinging the axle 5 around in a horizontal plane, as in turning the vehicle around, the ball 23 revolves in its ball-socket 18, the guiding head 36 at the same time revolving with the web 31 and allowing freer movement of said axle than could be produced in fifth wheels fitted with the common wide circular bearings.

When the axle 5 swings through a vertical plane, as in running one wheel of the vehicle into a depression in the ground, it swings on the ball and socket pivot described, the lower edge of the web 31 slipping freely through the guiding head 36 on a curved line concentric to said pivot.

The distance between the ball and socket joint above the axle 5 and the guiding head 36 below said axle gives said parts ample length of pivot bearing vertically, and thus prevents said axle from revolving in either direction from the different strains that are exerted against it.

In case of failure or breaking of any of the pivotal parts associated with the axle 5, the bracketed brace 32 prevents said axle from being drawn out from under the vehicle body.

The supporting block 10 is clamped to the spring 8 in the same manner as the corresponding parts of the other fifth wheels, or, in the absence of the spring 8, directly to the bolster or other supporting portions of the vehicle body.

Since the two plates 21 and 24 are clamped to the axle 5 by the bolts 25, as above described, said plates may be attached to any axle without cutting or drilling through it.

The arrangement of the fifth wheel as described make it readily attachable to any vehicle in use, and attains all of the other objects of the invention.

The foregoing being a full, clear and exact description of the invention, what I claim and desire to secure by Letters Patent is:—

1. In a fifth wheel an axle pivoted to the vehicle body, a web pendent from the axle and having its lower edge curved longitudinally, a brace having connection with the body, and a guiding member pivotally supported upon the brace and engaging the curved edge of said web.

2. In a fifth wheel an axle pivoted to the vehicle body, a web pendent from the axle, the lower edge of the web being longitudinally curved concentric to the pivotal point of the axle and having lateral flanges, and a guiding member supported from the body and slidably engaging the lower curved edge of said web and the lateral flanges thereof.

3. In a fifth wheel, the combination of an axle pivoted to the vehicle body to turn in all directions, a web pendent from the axle and having its lower edge curved, a guiding member supported from the body and engaging the lower curved edge of the web, and positive interlocking means between the said guiding member and curved edge of the pendent web.

4. In a fifth wheel, the combination of an axle, connecting means between the axle and vehicle body to admit of the axle swinging in all directions, a web pendent from the axle and having its lower edge curved concentric with the pivotal connection of the axle with the vehicle body, and having lateral flanges, and a guiding member supported from the body to turn about a vertical axis only and slidably engaging the lower curved edge of the web, and having interlocking connection with the lateral flanges thereof.

5. In a fifth wheel, a two-part ball-socket divided into front and rear portions, said socket being adapted to be secured to a vevicle spring or bed, the rear portion of the ball-socket having stubs for attachment to a coupling pole, the front part of the socket having a forwardly projecting lug, a plate adapted to rest on a vehicle axle, the plate having a neck and a ball on said neck pivotally retained in the ball-socket, a plate adapted to rest against the lower face of said axle and having a downwardly extending guiding web or wing, bolts connecting the plate of the upper face of the axle with the plate of the lower face, a guiding member engaging the lower edge of the guiding web, a bracketed brace extending under the lower plate and supporting the guiding member, the rear end of said brace projecting into position to be bolted to the coupling pole while the front end of said brace is secured to the lug on the front of the ball socket.

In testimony whereof I affix my signature in presence of two witnesses.

EWING BROWNFIELD.

Witnesses:
K. SCHUREMANN,
FRANK HOOPES.

Copies of this patent may be obtained for five cents each, by addressing the "Commissioner of Patents. Washington, D. C."